US010897602B2

(12) United States Patent
Inoue et al.

(10) Patent No.: US 10,897,602 B2
(45) Date of Patent: Jan. 19, 2021

(54) PROJECTION DISPLAY DEVICE FOR PERFORMING PROJECTION AND IMAGING COMPRISING OPTICAL IMAGE EMITTING LIGHT VALVE AND IMAGING OPTICAL SYSTEM

(71) Applicant: FUJIFILM Corporation, Tokyo (JP)

(72) Inventors: Kazuki Inoue, Saitama (JP); Chikara Yamamoto, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/511,006

(22) Filed: Jul. 15, 2019

(65) Prior Publication Data
US 2020/0033702 A1 Jan. 30, 2020

(30) Foreign Application Priority Data

Jul. 27, 2018 (JP) .................................. 2018-141676
Feb. 27, 2019 (JP) .................................. 2019-034990

(51) Int. Cl.
*H04N 9/31* (2006.01)
*G03B 17/54* (2006.01)
*G03B 21/28* (2006.01)

(52) U.S. Cl.
CPC ........... *H04N 9/3176* (2013.01); *G03B 17/54* (2013.01); *G03B 21/28* (2013.01); *H04N 9/3194* (2013.01)

(58) Field of Classification Search
CPC .... G03B 17/54; G03B 21/28; G03B 21/2073; H04N 9/3141; H04N 9/3176; H04N 9/3194; G02B 27/286; G02B 27/283; G02B 27/144
See application file for complete search history.

(56) References Cited

U.S. PATENT DOCUMENTS

| 6,707,444 B1* | 3/2004 | Hendriks | ............ G06F 3/03542 345/104 |
| 7,136,053 B2* | 11/2006 | Hendriks | ............ G06F 3/03542 345/179 |
| 7,355,584 B2* | 4/2008 | Hendriks | ............ G06F 3/03542 345/156 |
| 8,077,389 B2* | 12/2011 | Jabri | ...................... B82Y 20/00 252/585 |
| 8,526,108 B2* | 9/2013 | Weinold | ............ G02B 27/0101 359/443 |

(Continued)

FOREIGN PATENT DOCUMENTS

WO 2017014317 A1 1/2017

*Primary Examiner* — Bao-Luan Q Le
(74) *Attorney, Agent, or Firm* — Studebaker & Brackett PC (57) ABSTRACT

A projection display device includes an imaging element, a light source, a light valve that modulates light from the light source and emits modulated light in a prescribed polarization state, and an imaging optical system. The imaging optical system includes a first optical system that is used in common in projection and imaging, a second optical system that is used only in projection, a third optical system that is used only in imaging, and a separation member that separates an optical path from the second optical system toward the first optical system from an optical path from the first optical system toward the third optical system. The first optical system comprises a quarter wave plate and a polarizer arranged in a state of transmitting the light emitted from the light valve.

18 Claims, 7 Drawing Sheets

(56) References Cited

U.S. PATENT DOCUMENTS

| | | | | |
|---|---|---|---|---|
| 8,783,873 B2* | 7/2014 | Weinold | ............ | G02B 27/0101 |
| | | | | 353/20 |
| 9,405,405 B2* | 8/2016 | Shyu | .................... | G03B 21/26 |
| 10,048,476 B2* | 8/2018 | Amano | .................. | G02B 13/22 |
| 10,244,217 B2* | 3/2019 | Kaneda | .................. | H04N 9/317 |
| 10,372,269 B2* | 8/2019 | Miura | .................. | H04N 9/3197 |
| 10,602,108 B2* | 3/2020 | Kaneda | .................. | H04N 9/317 |
| 10,659,669 B2* | 5/2020 | Yasui | .................. | G02B 27/283 |
| 2003/0122780 A1* | 7/2003 | Hendriks | ............ | G06F 3/03542 |
| | | | | 345/156 |
| 2005/0162409 A1* | 7/2005 | Hendriks | ............ | G06F 3/03542 |
| | | | | 345/173 |
| 2007/0263174 A1* | 11/2007 | Shyu | .................... | G06F 3/0304 |
| | | | | 353/34 |
| 2008/0051135 A1* | 2/2008 | Destain | .................. | G03B 21/20 |
| | | | | 455/556.1 |
| 2009/0168172 A1* | 7/2009 | Jabri | .................... | B82Y 20/00 |
| | | | | 359/487.06 |
| 2012/0081673 A1* | 4/2012 | Weinold | ............... | H04N 9/3155 |
| | | | | 353/20 |
| 2012/0182610 A1* | 7/2012 | O'Hara | .............. | G02B 27/0101 |
| | | | | 359/460 |
| 2012/0280941 A1* | 11/2012 | Hu | ........................ | G03B 33/12 |
| | | | | 345/175 |
| 2013/0107223 A1* | 5/2013 | Toyooka | ............ | G03B 21/2033 |
| | | | | 353/31 |
| 2015/0138515 A1* | 5/2015 | Shyu | .................... | H04N 9/3197 |
| | | | | 353/81 |
| 2016/0246037 A1* | 8/2016 | Amano | ................ | G02B 17/008 |
| 2017/0208305 A1* | 7/2017 | Kaneda | ............... | H04N 9/3167 |
| 2018/0321475 A1* | 11/2018 | Amano | .................. | G02B 13/22 |
| 2018/0321476 A1* | 11/2018 | Amano | .................. | G02B 13/06 |
| 2019/0174105 A1* | 6/2019 | Kaneda | .................. | G03B 21/00 |

* cited by examiner

PROJECTION DISPLAY DEVICE FOR PERFORMING PROJECTION AND IMAGING COMPRISING OPTICAL IMAGE EMITTING LIGHT VALVE AND IMAGING OPTICAL SYSTEM

CROSS REFERENCE TO RELATED APPLICATIONS

The present application claims priority under 35 U.S.C. § 119 to Japanese Patent Application No. 2018-141676 filed on Jul. 27, 2018, and Japanese Patent Application No. 2019-034990 filed on Feb. 27, 2019. The above applications are hereby expressly incorporated by reference, in its entirety, into the present application.

BACKGROUND OF THE INVENTION

1. Field of the Invention

The present disclosure relates to a projection display device.

2. Description of the Related Art

In recent years, a projection display device that comprises a light valve, such as a liquid crystal display element or a liquid crystal on silicon (LCOS) display element, comprises an imaging element, such as a charge coupled device (CCD) or a complementary metal oxide semiconductor (CMOS), and can perform both of projection and imaging has been suggested (for example, WO2017/014317).

SUMMARY OF THE INVENTION

The projection display device of WO2017/014317 comprises a separation member that separates an optical path from a light valve toward a screen from an optical path from a magnification side (screen side) toward an imaging element, and is configured such that a part of an imaging optical system in the projection display device is used in common at the time of projection and at the time of imaging.

However, in the projection display device of WO2017/014317, there is a concern that a part of light emitted from the light valve leaks to the imaging element side due to the performance of the separation member. Since light emitted from the light valve has high brightness to be projected onto the screen, in a case where light with high brightness leaks from the light valve to the imaging element side, leakage causes deterioration of imaging quality, such as occurrence of strong ghost in a captured image.

The present disclosure has been accomplished in consideration of the above-described situation, and an object of the present disclosure is to provide a projection display device capable of performing both of projection and imaging, and suppressing deterioration of imaging quality.

Specific means for solving the above-described problem include the following aspects.

<1> A projection display device comprising an imaging element that performs imaging with received light, a light valve that emits an optical image based on image data in a prescribed polarization state, and an imaging optical system that projects an optical image of light emitted from the light valve onto a magnification side imaging surface and forms an image of light incident from a magnification side on the imaging element, in which the imaging optical system comprises a first optical system that comprises at least one lens and is used in common in projection and imaging, a second optical system that comprises at least one lens and is used only in projection, a third optical system that comprises at least one lens and is used only in imaging, and a separation member that separates an optical path from the second optical system toward the first optical system from an optical path from the first optical system toward the third optical system, and the first optical system comprises, in order from the magnification side, a quarter wave plate and a polarizer arranged in a state of transmitting the light emitted from the light valve or the third optical system comprises a polarizer arranged in a state of shielding the light emitted from the light valve.

<2> The projection display device of <1>, in which an extinction ratio of the polarizer is less than 0.1%. Here, the "extinction ratio" means a transmittance ratio of light in a direction perpendicular to a transmission axis to light in a transmission axis direction.

<3> The projection display device of <1> or <2>, in which, in a case where the first optical system comprises the quarter wave plate and the polarizer, the quarter wave plate and the polarizer are arranged on a most reduction side in the first optical system on an optical path.

<4> The projection display device of any one of <1> to <3>, in which the separation member is a reflective polarizer.

<5> The projection display device of any one of <1> to <4>, further comprising an adjustment mechanism that adjusts a transmission axis direction of the polarizer comprised in the first optical system or the polarizer comprised in the third optical system.

<6> The projection display device of any one of <1> to <5>, in which, in a case where the third optical system comprises the polarizer, the polarizer is arranged on a most magnification side in the third optical system on an optical path.

<7> The projection display device of any one of <1> to <6>, in which the second optical system comprises a polarizer arranged in a state of transmitting the light emitted from the light valve.

<8> The projection display device of <7>, further comprising an adjustment mechanism that adjusts a transmission axis direction of the polarizer comprised in the second optical system.

<9> The projection display device of <7> or <8>, in which the polarizer comprised in the second optical system is arranged on a most magnification side in the second optical system on an optical path.

<10> The projection display device of any one of <1> to <9>, further comprising two or more polarizers between a lens of the first optical system on a most reduction side on an optical path and the imaging element.

<11> The projection display device of any one of <1> to <10>, in which an optical system consisting of the first optical system and the second optical system to be used in projection is a relay optical system that forms an intermediate image.

<12> The projection display device of any one of <1> to <11>, in which an optical system consisting of the first optical system and the third optical system to be used in imaging is a relay optical system that forms an intermediate image.

<13> The projection display device of <11> or <12>, in which the separation member is arranged to be closer to the magnification side than the intermediate image on an optical path.

<14> A projection display device comprising an imaging element that performs imaging with received light, a light valve that emits an optical image based on image data, and an imaging optical system that projects an optical image of light emitted from the light valve onto a magnification side imaging surface and forms an image of light incident from a magnification side on the imaging element, in which the imaging optical system comprises a first optical system that comprises at least one lens and is used in common in projection and imaging, a second optical system that comprises at least one lens and is used only in projection, a third optical system that comprises at least one lens and is used only in imaging, and a separation member that is transflective and separates an optical path from the second optical system toward the first optical system from an optical path from the first optical system toward the third optical system, and the separation member is arranged on a most magnification side among reflection members in the imaging optical system.

<15> The projection display device of <14>, in which the separation member is arranged in a state of reflecting light on the optical path from the second optical system toward the first optical system and transmitting light on the optical path from the first optical system toward the third optical system.

<16> The projection display device of <15>, in which the separation member has a transflective reflective film that is formed on one surface of a transparent substrate and faces the first optical system, and is arranged in a state of reflecting light on the optical path from the second optical system toward the first optical system and transmitting light on the optical path from the first optical system toward the third optical system.

<17> The projection display device of any one of <14> to <16>, in which an optical system consisting of the first optical system and the second optical system to be used in projection is a relay optical system that forms an intermediate image.

<18> The projection display device of any one of <14> to <17>, in which an optical system consisting of the first optical system and the third optical system to be used in imaging is a relay optical system that forms an intermediate image.

<19> The projection display device of <17> or <18>, in which the separation member is arranged to be closer to the magnification side than the intermediate image on an optical path.

According to the present disclosure, it is possible to provide a projection display device capable of suppressing deterioration of imaging quality.

DESCRIPTION OF THE PREFERRED EMBODIMENTS

Figure 1:
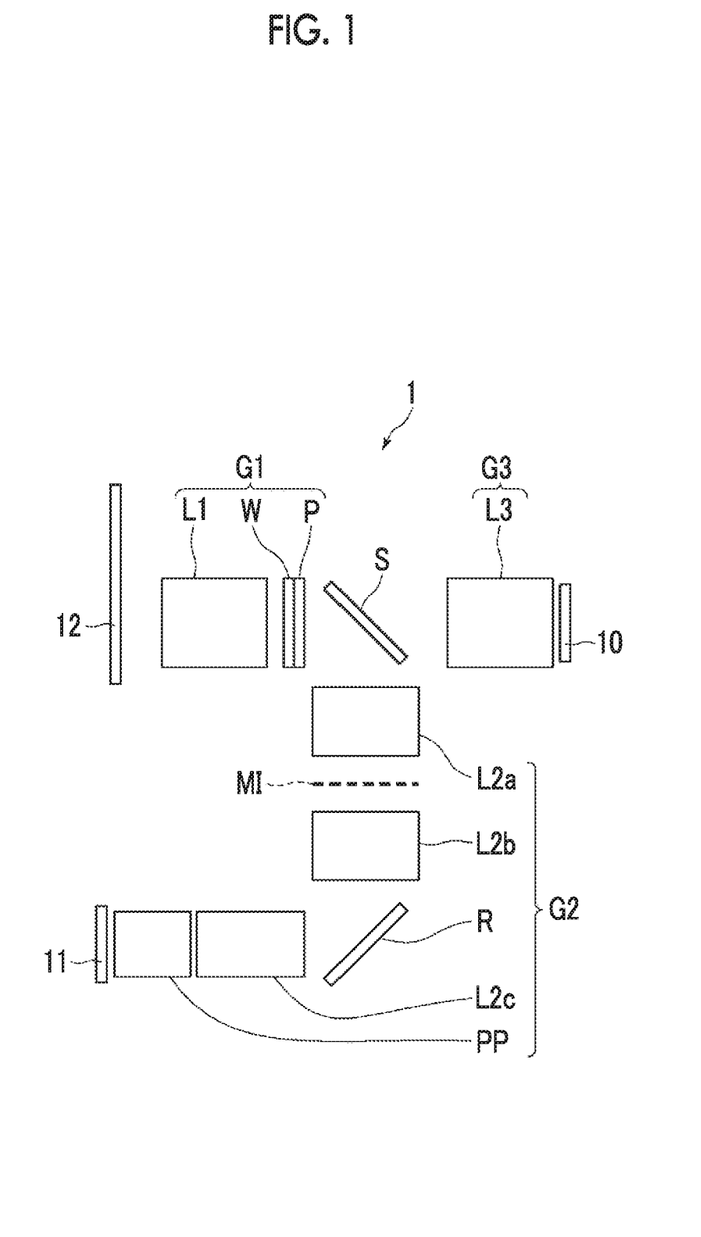
FIG. 1 is a schematic configuration diagram of a projection display device according to a first embodiment of the invention.

Hereinafter, a first embodiment of a projection display device of the invention will be described in detail referring to the drawings. FIG. 1 is a schematic configuration diagram of a projection display device according to the first embodiment of the invention. In FIG. 1, a screen 12 side becomes a magnification side in an optical path order.

As shown in FIG. 1, a projection display device 1 of the embodiment comprises an imaging element 10 that performs imaging with received light, an image projection unit 11 that consists of a light source and a light valve, and an imaging optical system that projects an optical image of light optically modulated by the light valve onto a screen (magnification side imaging surface) 12 and forms an image of light incident from the magnification side on the imaging element.

The light valve modulates light from the light source and emits modulated light in a prescribed polarization state. As an image display element that is used for the light valve, any image display element, such as a liquid crystal display element or a liquid crystal on silicon (LCOS) display element, may be used. The light source may be appropriately composed corresponding to a system of the image display element of the light valve.

The imaging optical system comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises, in order from the magnification side on the optical path, a lens group L1, a quarter wave plate W, and a polarizer P arranged in a state of transmitting light emitted from the light valve.

The second optical system G2 comprises, in order from the magnification side on the optical path, a lens group L2a, a lens group L2b, a reflection member R, a lens group L2c, and an optical member PP assumed to be a filter, a prism, or the like that is used in a color synthesis unit or an illumination light separation unit.

The third optical system G3 comprises a lens group L3.

Each lens group in the first optical system G1, the second optical system G2, and the third optical system G3 is not limited to a configuration in which the lens group consists of a plurality of lenses, and may have a configuration in which the lens group consists of only one lens.

The separation member S reflects light from the second optical system G2 toward the first optical system G1 and transmits light from the first optical system G1 toward the third optical system G3, and is composed of, for example, a transflective member, such as a half mirror.

The imaging optical system is composed as described above, whereby it is possible to secure the number of lenses (the lenses of the first optical system G1 and the second optical system G2) to be used in projection to provide high projection performance while suppressing the number of lenses of the first optical system G1 to be used in common in projection and imaging. Similarly, it is possible to secure the number of lenses (the lenses of the first optical system G1 and the third optical system G3) to be used in imaging to provide high imaging performance.

The number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

In addition, the quarter wave plate W and the polarizer P arranged in a state of transmitting light (projection light) emitted from the light valve are comprised in the first optical system G1, whereby it is possible to further reduce reflected light of projection light incident from the first optical system G1 on the third optical system G3.

An operation will be described specifically. As an example, a case where linearly polarized projection light is emitted from the image projection unit 11 will be described. Projection light emitted from the light valve in a linearly polarized state (for example, a vertical direction in the drawing) is transmitted through the polarizer P, and is converted to a circularly polarized state (for example, a right-handed circularly polarized state) when transmitted through the quarter wave plate W. Then, in a case where projection light in the circularly polarized state (for example, the right-handed circularly polarized state) is reflected by the lens group L1, a rotation direction of circularly polarized light is reversed.

Reflected light in the reversed circularly polarized state (for example, a left-handed circularly polarized state) is converted to a linearly polarized state (for example, a horizontal direction in the drawing) when transmitted through the quarter wave plate W again; however, since the direction of linearly polarized light at this time is rotated by 90° compared to when light is emitted from the light valve, light cannot be transmitted through the polarizer P. Accordingly, it is possible to reduce reflected light of projection light incident from the first optical system G1 on the third optical system G3.

On the other hand, since light incident from the magnification side of the first optical system G1 at the time of imaging is in a non-polarization state and includes light in all vibration directions, a part of light is transmitted through the polarizer P and is incident on the third optical system G3. Accordingly, it is possible to perform imaging without any troubles.

Since it is assumed that the screen 12 has a matte surface suitable for projecting video, video projected from the image projection unit 11 onto the screen 12 has no polarization state by so-called Lambertian reflectance. For this reason, even for video projected onto the screen 12, it is possible to perform imaging without any troubles.

In the projection display device 1 of the embodiment, in a case of reducing reflected light of projection light incident from the first optical system G1 on the third optical system G3, the reduction amount of reflected light depends on the performance of the polarizer P. For this reason, the extinction ratio of the polarizer is less than 0.1%, whereby it is possible to sufficiently reduce reflected light of projection light incident from the first optical system G1 on the third optical system G3.

It is preferable that, in a case where the quarter wave plate W and the polarizer P are comprised in the first optical system G1, the quarter wave plate W and the polarizer P are arranged on a most reduction side in the first optical system G1 on the optical path. With such a configuration, it is possible to increase an effect in a case of reducing reflected light of projection light incident from the first optical system G1 on the third optical system G3.

It is preferable that an adjustment mechanism that adjusts the transmission axis direction of the polarizer P is comprised. For example, in a case where relative position fluctuation between the image projection unit 11 and each optical element composing the imaging optical system occurs due to change in temperature, deformation, or the like, it is not possible to precisely control light to be transmitted or shielded in the light polarizer P. For this reason, the above-described adjustment mechanism is comprised, whereby it is possible to precisely control light to be transmitted or shielded in the polarizer P even in a case where the relative position fluctuation between the image projection unit 11 and each optical element composing the imaging optical system occurs.

The adjustment of the transmission axis direction of the polarizer P with the adjustment mechanism may be performed manually or may be performed automatically in combination with various sensors. In a case where the adjustment is performed automatically, for example, a sensor that detects the relative position fluctuation between the image projection unit 11 and each optical element composing the imaging optical system may be provided, and the transmission axis direction of the polarizer P may be adjusted based on the relative position fluctuation. Alternatively, light of a predetermined amount may be projected from the image projection unit 11, and the transmission axis direction of the polarizer P may be adjusted such that the amount of light detected by the imaging element 10 becomes a reference value (for example, a value in a case where there is no relative position fluctuation).

It is preferable that an optical system consisting of the first optical system G1 and the second optical system G2 to be used in projection is a relay optical system that forms an intermediate image MI. With such a configuration, it is possible to achieve a wide angle with one eye. Furthermore, an optical system to be used in projection is composed of a relay optical system, a reflection member that bends the optical path is easily inserted into the optical system, and a light beam on the projection display device side in projection light emitted from the projection display device can approach a horizontal state to a housing of the projection display device. For this reason, it is possible to improve the installability of the projection display device.

In this case, the separation member S is arranged to be closer to the magnification side than the intermediate image MI on the optical path. With such a configuration, the number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

Even an optical system consisting of the first optical system G1 and the third optical system G3 to be used in imaging may be composed of a relay optical system that forms an intermediate image. With such a configuration, it is possible to achieve a wide angle with one eye. The optical system to be used in imaging is composed of a relay optical system, whereby a reflection member that bands the optical path is easily inserted into the third optical system G3. For this reason, even in a case where the third optical system G3 is designed with high performance to comprise multiple lenses, it is possible to suppress the total length of the third optical system G3. Therefore, it is possible to achieve both of performance and reduction in size of the projection display device.

Figure 2:
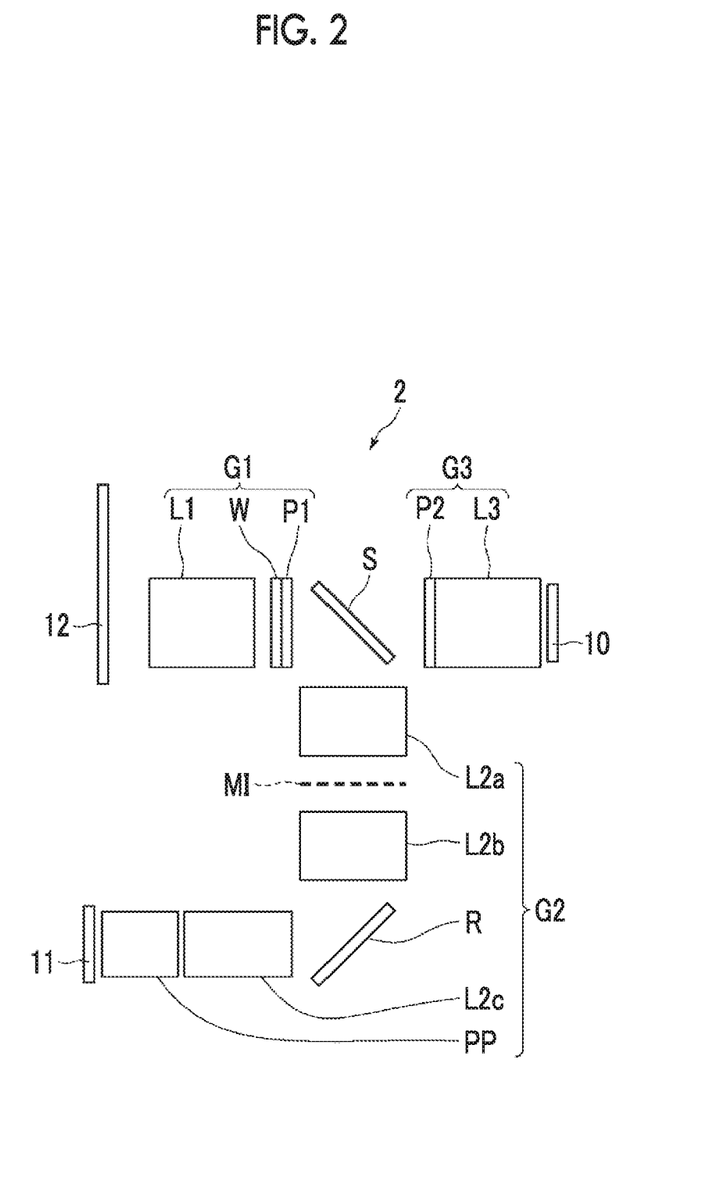
FIG. 2 is a schematic configuration diagram of a projection display device according to a second embodiment of the invention.

Next, a second embodiment of a projection display device of the invention will be described in detail referring to the drawings. FIG. 2 is a schematic configuration diagram of a projection display device according to the second embodiment of the invention. In FIG. 2, the screen 12 side becomes the magnification side in the optical path order. In the embodiment, elements similar to the elements in FIG. 1 are represented by the same reference numerals and description thereof will not be repeated unless needed. Here, only a difference will be primarily described.

As shown in FIG. 2, a projection display device 2 of the embodiment is different from the projection display device 1 of the first embodiment in that a polarizer P2 is added on the most magnification side in the third optical system G3. The polarizer P2 is arranged such that a transmission axis direction of the polarizer P2 becomes the same direction as a transmission axis direction of a polarizer P1 (the polarizer P in FIG. 1).

Even in the projection display device 2 of the embodiment, it is possible to obtain the same effects as the projection display device 1 of the first embodiment. In addition, since the two polarizers P1 and P2 are comprised between a lens of the first optical system G1 on a most reduction side on the optical path to the imaging element 10, the extinction ratio of the entire polarizer portion decreases, and it is possible to further reduce reflected light of projection light incident from the first optical system G1 on the third optical system G3.

Figure 3:
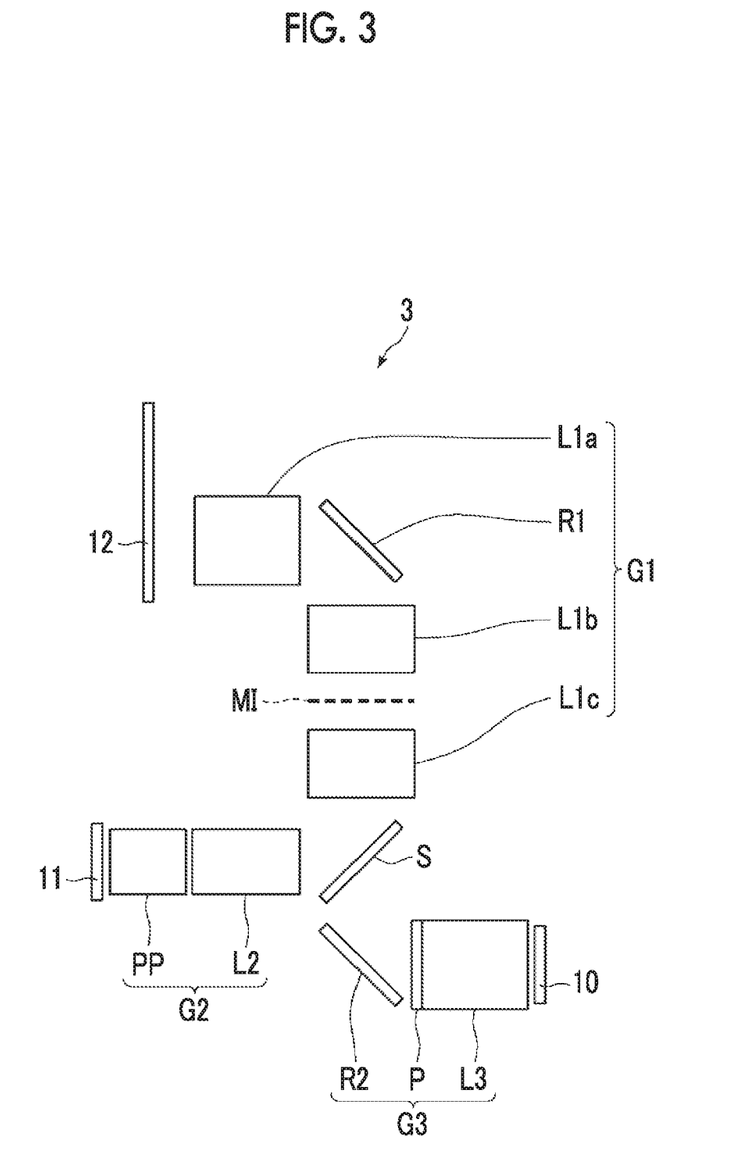
FIG. 3 is a schematic configuration diagram of a projection display device according to a third embodiment of the invention.

Next, a third embodiment of a projection display device of the invention will be described in detail referring to the drawings. FIG. 3 is a schematic configuration diagram of a projection display device according to the third embodiment of the invention. In FIG. 3, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 3 of the embodiment has the configuration of the imaging optical system different from the projection display device 1 of the first embodiment. As shown in FIG. 3, the imaging optical system of the projection display device 3 of the embodiment comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises, in order from the magnification side on an optical path, a lens group L1a, a reflection member R1, a lens group L1b, and a lens group L1c.

The second optical system G2 comprises, in order from the magnification side on an optical path, a lens group L2, and an optical member PP assumed to be a filter, a prism, or the like that is used in a color synthesis unit or an illumination light separation unit.

The third optical system G3 comprises, in order from the magnification side on the optical path, a reflection member R2, a polarizer P arranged in a state of shielding light emitted from the light valve, and a lens group L3.

The separation member S reflects light from the second optical system G2 toward the first optical system G1 and transmits light from the first optical system G1 toward the third optical system G3, and is composed of, for example, a transflective member, such as a half mirror.

The imaging optical system is composed as described above, whereby it is possible to secure the number of lenses (the lenses of the first optical system G1 and the second optical system G2) to be used in projection to provide high projection performance while suppressing the number of lenses of the first optical system G1 to be used in common in projection and imaging. Similarly, it is possible to secure the number of lenses (the lenses of the first optical system G1 and the third optical system G3) to be used in imaging to provide high imaging performance.

The number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

The polarizer P arranged in a state of shielding light (projection light) emitted from the light valve is comprised in the third optical system G3, whereby it is possible to reduce projection light incident from the second optical system G2 on the third optical system G3 and reflected light of projection light incident from the first optical system G1 into the third optical system G3.

An operation will be described specifically. As an example, a case where a linear polarizer is used for the polarizer P will be described. While projection light emitted from the light valve in a predetermined polarization state passes the second optical system G2 and is reflected to the first optical system G1 side by the separation member S, a part of light may leak to the third optical system G3 side.

Projection light incident from the second optical system G2 on the third optical system G3 is incident on the polarizer P by way of the reflection member R2; however, since the polarizer P is arranged in a state of shielding light emitted from the light valve, light cannot be transmitted through the polarizer P. Accordingly, it is possible to reduce projection light incident from the second optical system G2 on the third optical system G3.

For reflected light of projection light incident from the first optical system G1 on the third optical system G3, in a case where light emitted from the light valve is linearly polarized light, a polarization direction is not changed compared to when light is emitted from the light valve. Furthermore, for reflected light of projection light incident from the first optical system G1 on the third optical system G3, in a case where light emitted from the light valve is circularly polarized light, a rotation direction of polarized light is reversed compared to when light is emitted from the light valve, but it is the same that polarized light is circularly polarized light. For this reason, reflected light of projection light incident from the first optical system G1 on the third optical system G3 is incident on the polarizer P by way of the reflection member R2; however, since the polarizer P is arranged in a state of shielding light emitted from the light valve, light cannot be transmitted through the polarizer P. Accordingly, it is possible to reduce reflected light of projection light incident from the first optical system G1 into the third optical system G3.

On the other hand, since light incident from the magnification side of the first optical system G1 at the time of imaging is in a non-polarization state and includes light in all vibration directions, a part of light is transmitted through the polarizer P and is incident on the third optical system G3. Accordingly, it is possible to perform imaging without any troubles.

Since it is assumed that the screen 12 has a matte surface suitable for projecting video, video projected from the image projection unit 11 onto the screen 12 has no polarization state by so-called Lambertian reflectance. For this reason, even for video projected onto the screen 12, it is possible to perform imaging without any troubles.

It is preferable that a projection display device 3 of the embodiment comprises an adjustment mechanism that adjusts the transmission axis direction of the polarizer P. For example, in a case where the relative position fluctuation between the image projection unit 11 and each optical element composing the imaging optical system occurs due to change in temperature, deformation, or the like, it is not possible to precisely control light to be transmitted or shielded in the light polarizer P. For this reason, the above-described adjustment mechanism is comprised, whereby it is possible to precisely control light to be transmitted or shielded in the polarizer P even in a case where the relative position fluctuation between the image projection unit 11 and each optical element composing the imaging optical system occurs.

The adjustment of the transmission axis direction of the polarizer P with the adjustment mechanism may be performed manually or may be performed automatically in combination with various sensors. In a case where the adjustment is performed automatically, for example, a sensor that detects the relative position fluctuation between the image projection unit 11 and each optical element composing the imaging optical system may be provided, and the transmission axis direction of the polarizer P may be adjusted based on the relative position fluctuation. Alternatively, light of a predetermined amount may be projected from the image projection unit 11, and the transmission axis direction of the polarizer P may be adjusted such that the amount of light detected by the imaging element 10 becomes a reference value (for example, a value in a case where there is no relative position fluctuation).

It is preferable that, in a case where the polarizer P is comprised in the third optical system G3, the polarizer P is arranged on the most magnification side in the third optical system G3 on the optical path. With such a configuration, it is possible to eliminate the influence of polarization revolution in the third optical system G3.

It is preferable that an optical system consisting of the first optical system G1 and the second optical system G2 to be used in projection is a relay optical system that forms an intermediate image MI. With such a configuration, it is possible to achieve a wide angle with one eye. Furthermore, an optical system to be used in projection is composed of a relay optical system, a reflection member that bends the optical path is easily inserted into the optical system, and a light beam on the projection display device side in projection light emitted from the projection display device can approach a horizontal state to a housing of the projection display device. For this reason, it is possible to improve the installability of the projection display device.

Figure 4:
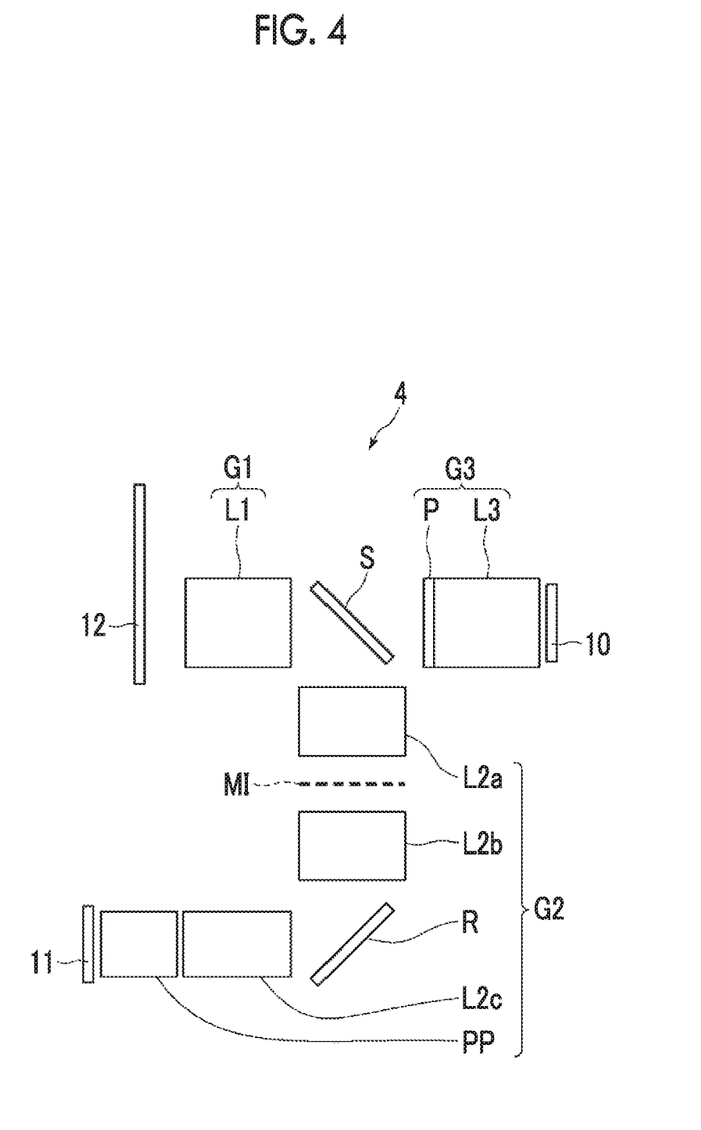
FIG. 4 is a schematic configuration diagram of a projection display device according to a fourth embodiment of the invention.

Next, a fourth embodiment of a projection display device of the invention will be described in detail referring to the drawings. FIG. 4 is a schematic configuration diagram of a projection display device according to the fourth embodiment of the invention. In FIG. 4, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 4 of the embodiment has the configuration of the imaging optical system different from the projection display device 3 of the third embodiment. As shown in FIG. 4, the imaging optical system of the projection display device 4 of the embodiment comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises a lens group L1.

The second optical system G2 comprises, in order from the magnification side on the optical path, a lens group L2a, a lens group L2b, a reflection member R, a lens group L2c, and an optical member PP assumed to be a filter, a prism, or the like that is used in a color synthesis unit or an illumination light separation unit.

The third optical system G3 comprises, in order from the magnification side on the optical path, a polarizer P arranged in a state of shielding light emitted from the light valve and a lens group L3.

The separation member S reflects light from the second optical system G2 toward the first optical system G1 and transmits light from the first optical system G1 toward the third optical system G3, and is composed of, for example, a transflective member, such as a half mirror.

Even in the projection display device 4 of the embodiment, it is possible to obtain the same effects as the projection display device 3 of the third embodiment. In addition, since the separation member S is arranged to be closer to the magnification side than the intermediate image MI on the optical path, the number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

Figure 5:
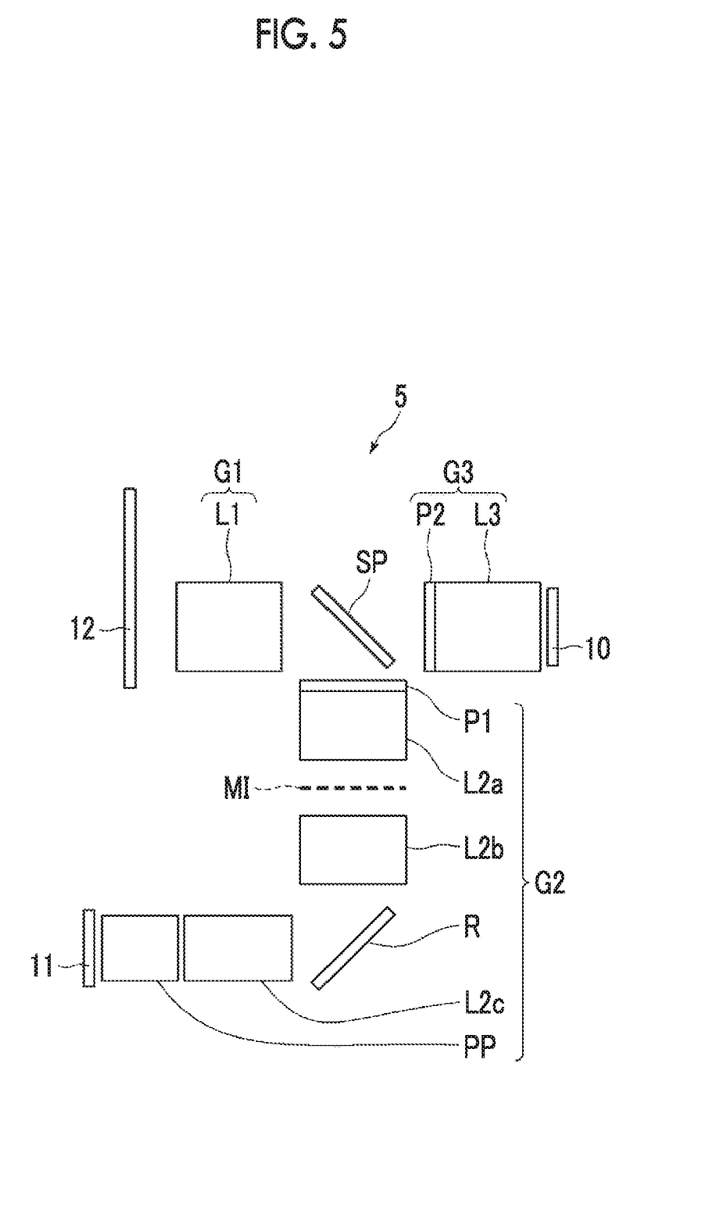
FIG. 5 is a schematic configuration diagram of a projection display device according to a fifth embodiment of the invention.

Next, a fifth embodiment of a projection display device of the invention will be described in detail referring to the drawings. FIG. 5 is a schematic configuration diagram of a projection display device according to the fifth embodiment of the invention. In FIG. 5, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 5 of the embodiment has the configuration of the imaging optical system different from the projection display device 1 of the first embodiment. As shown in FIG. 5, the imaging optical system of the projection display device 5 of the embodiment comprises a first optical system G1 that comprises at least one lens and is used in common in projection and imaging, a second optical system G2 that comprises at least one lens and is used only in projection, a third optical system G3 that comprises at least one lens and is used only in imaging, and a separation member SP that separates an optical path from the second optical system G2 toward the first optical system G1 from an optical path from the first optical system G1 toward the third optical system G3.

The first optical system G1 comprises a lens group L1.

The second optical system G2 comprises, in order from the magnification side on the optical path, a polarizer P1 arranged in a state of transmitting light emitted from the light valve, a lens group L2a, a lens group L2b, a reflection member R, a lens group L2c, and an optical member PP assumed to be a filter, a prism, or the like that is used in a color synthesis unit or an illumination light separation unit.

The third optical system G3 comprises, in order from the magnification side on the optical path, a polarizer P2 arranged in a state of shielding light (projection light) emitted from the light valve and a lens group L3.

The separation member SP reflects light from the second optical system G2 toward the first optical system G1 and transmits light from the first optical system G1 toward the third optical system G3, and is composed of a reflective polarizer.

The imaging optical system is composed as described above, whereby it is possible to secure the number of lenses (the lenses of the first optical system G1 and the second optical system G2) to be used in projection to provide high projection performance while suppressing the number of lenses of the first optical system G1 to be used in common in projection and imaging. Similarly, it is possible to secure the number of lenses (the lenses of the first optical system G1 and the third optical system G3) to be used in imaging to provide high imaging performance.

The number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

The polarizer P1 arranged in a state of transmitting light emitted from the light valve is provided in the second optical system G2, whereby the extinction ratio of the entire polarizer portion decreases, and it is possible to reduce projection light and reflected light of projection light incident on the third optical system G3.

The polarizer P arranged in a state of shielding light (projection light) emitted from the light valve is comprised in the third optical system G3, whereby it is possible to reduce projection light incident from the second optical system G2 on the third optical system G3 and reflected light of projection light incident from the first optical system G1 into the third optical system G3.

In addition, the separation member SP is composed of a reflective polarizer, whereby the extinction ratio of the entire polarizer portion decreases, and it is possible to further reduce reflected light of projection light incident from the first optical system G1 on the third optical system G3.

An operation will be described specifically. As an example, a case where linearly polarized projection light is emitted from the image projection unit 11 will be described. Projection light emitted from the light valve in a linearly polarized state (for example, a vertical direction in the drawing) is transmitted through the polarizer P1, whereby light resolved from a polarization state when emitted from the light valve is eliminated, and only light in a polarization state when emitted from the light valve is reflected to the first optical system G1 side by the separation member (reflective polarizer) SP.

At this time, a part of light may leak to the third optical system G3 side; however, since the polarizer P2 is arranged in a state of shielding light emitted from the light valve, light cannot be transmitted through the polarizer P2. Accordingly, it is possible to reduce projection light incident from the second optical system G2 into the third optical system G3.

For reflected light of projection light in the first optical system G1, since light emitted from the light valve is linearly polarized light, a polarization direction of light is not changed compared to when light is emitted from the light valve. For this reason, reflected light of projection light in the first optical system G1 is reflected to the second optical system G2 by the separation member (reflective polarizer) SP. Accordingly, it is possible to reduce reflected light of projection light incident from the first optical system G1 into the third optical system G3.

On the other hand, since light incident from the magnification side of the first optical system G1 at the time of imaging is in a non-polarization state and includes light in all vibration directions, a part of light (for example, light, the direction of linear polarization of which is rotated by 90° compared to when light is emitted from the light valve) is transmitted through separation member (reflective polarizer) SP and the polarizer P2, and is incident on the third optical system G3. Accordingly, it is possible to perform imaging without any troubles.

Since it is assumed that the screen 12 has a matte surface suitable for projecting video, video projected from the image projection unit 11 onto the screen 12 has no polarization state by so-called Lambertian reflectance. For this reason, even for video projected onto the screen 12, it is possible to perform imaging without any troubles.

It is preferable that the projection display device 5 of the embodiment comprises an adjustment mechanism that adjusts the transmission axis direction of the polarizer P1. Such an adjustment mechanism is comprised, whereby it is possible to precisely control light to be transmitted or shielded in the polarizer P1 even in a case where the relative position fluctuation between the image projection unit 11 and each optical element composing the imaging optical system occurs.

It is preferable that the polarizer P1 comprised in the second optical system G2 is arranged on the most magnification side in the second optical system G2 on the optical path. With such a configuration, it is possible to eliminate the influence of polarization revolution in the second optical system G2.

It is preferable that an optical system consisting of the first optical system G1 and the second optical system G2 to be used in projection is a relay optical system that forms an intermediate image MI. With such a configuration, it is possible to achieve a wide angle with one eye. Furthermore, an optical system to be used in projection is composed of a relay optical system, a reflection member that bends the optical path is easily inserted into the optical system, and a light beam on the projection display device side in projection light emitted from the projection display device can approach a horizontal state to a housing of the projection display device. For this reason, it is possible to improve the installability of the projection display device.

In this case, it is preferable that the separation member (reflective polarizer) SP is arranged to be closer to the magnification side than the intermediate image MI on the optical path. With such a configuration, the number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

Figure 6:
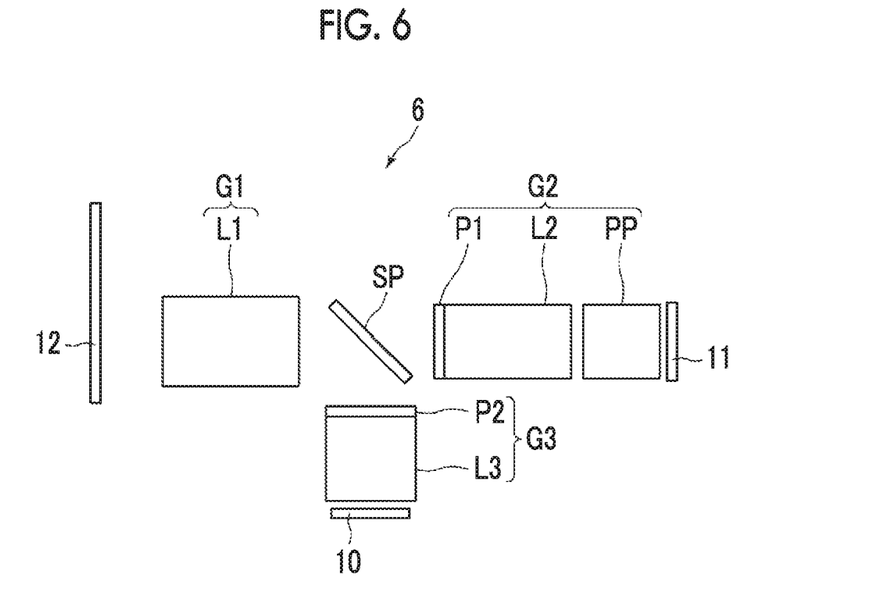
FIG. 6 is a schematic configuration diagram of a projection display device according to a sixth embodiment of the invention.

Next, a sixth embodiment of a projection display device of the invention will be described in detail referring to the drawings. FIG. 6 is a schematic configuration diagram of a projection display device according to the sixth embodiment of the invention. In FIG. 6, the screen 12 side becomes the magnification side in the optical path order. In the embodiment, elements similar to the elements in FIG. 1 are represented by the same reference numerals and description thereof will not be repeated unless needed. Here, only a difference will be primarily described.

As shown in FIG. 6, while a projection display device 6 of the embodiment has the configuration of a second optical system G2 slightly different from the projection display device 5 of the fifth embodiment, the positions of the second optical system G2 and the third optical system G3 with respect to the separation member SP are changed.

The second optical system G2 of the embodiment comprises, in order from the magnification side on the optical path, a polarizer P1 arranged in a state of transmitting light emitted from the light valve, a lens group L2, and an optical member PP assumed to be a filter, a prism, or the like that is used in a color synthesis unit or an illumination light separation unit.

The separation member SP transmits light from the second optical system G2 toward the first optical system G1 and reflects light from the first optical system G1 toward the third optical system G3.

Even in the projection display device 6 of the embodiment, it is possible to obtain the same effects as the projection display device 5 of the fifth embodiment.

Figure 7:
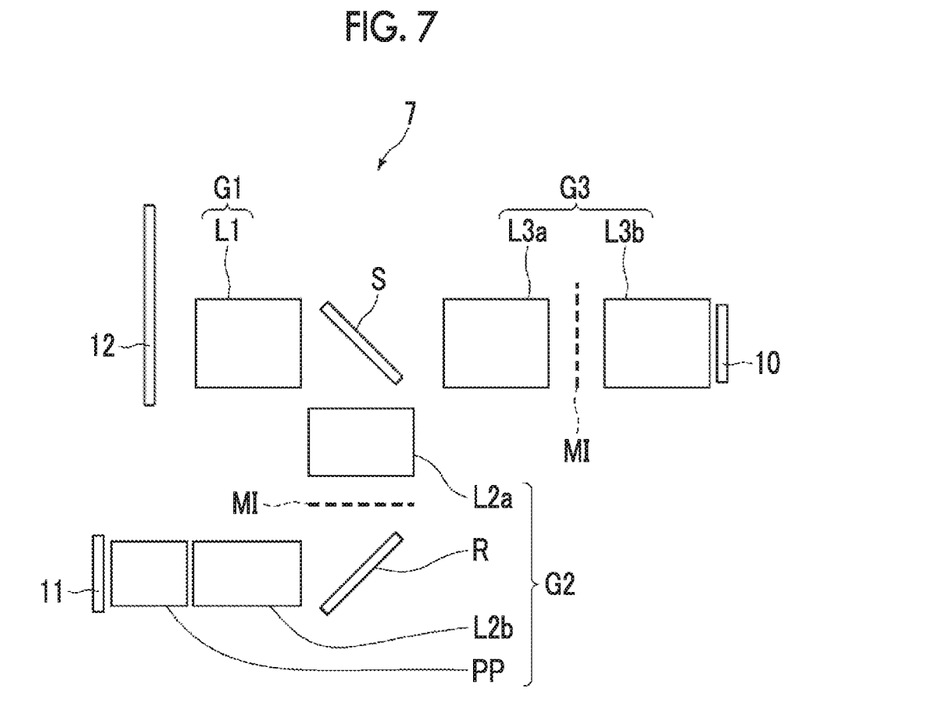
FIG. 7 is a schematic configuration diagram of a projection display device according to a seventh embodiment of the invention.

Next, a seventh embodiment of a projection display device of the invention will be described in detail referring to the drawings. FIG. 7 is a schematic configuration diagram of a projection display device according to the seventh embodiment of the invention. In FIG. 7, the screen 12 side becomes the magnification side in the optical path order.

As shown in FIG. 7, a projection display device 7 of the embodiment comprises an imaging element 10 that performs imaging with received light, an image projection unit 11 consisting of a light source and a light valve, and an imaging optical system that projects an optical image of light optically modulated by the light valve onto the screen (magnification side imaging surface) 12 and forms an image of light incident from the magnification side on the imaging element.

The light valve modulates light from the light source and emits modulated light. As an image display element that is used for the light valve, any image display element, such as a liquid crystal display element or a liquid crystal on silicon (LCOS) display element, may be used. The light source may be appropriately composed corresponding to a system of the image display element of the light valve.

The imaging optical system comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises a lens group L1.

The second optical system G2 comprises, in order from the magnification side on the optical path, a lens group L2a, a reflection member R, a lens group L2b, and an optical member PP assumed to be a filter, a prism, or the like that is used in a color synthesis unit or an illumination light separation unit.

The third optical system G3 comprises, in order from the magnification side on the optical path, a lens group L3a and a lens group L3b.

Each lens group in the first optical system G1, the second optical system G2, and the third optical system G3 is not limited to a configuration in which the lens group consists of a plurality of lenses, and may have a configuration in which the lens group consists of only one lens.

The separation member S reflects light from the second optical system G2 toward the first optical system G1 and transmits light from the first optical system G1 toward the third optical system G3, and is composed of, for example, a transflective member, such as a half mirror.

The separation member S is arranged on the most magnification side among the reflection members in the imaging optical system. Here, the "reflection members" mean members that reflect least 10% or more of incident light. In the embodiment, the separation member S and the reflection member R correspond to the reflection members.

The imaging optical system is composed as described above, whereby it is possible to secure the number of lenses (the lenses of the first optical system G1 and the second optical system G2) to be used in projection to provide high projection performance while suppressing the number of lenses of the first optical system G1 to be used in common in projection and imaging. Similarly, it is possible to secure the number of lenses (the lenses of the first optical system G1 and the third optical system G3) to be used in imaging to provide high imaging performance.

The separation member S is arranged on the most magnification side among the reflection members in the imaging optical system, whereby it is possible to further reduce the number of lenses (the lenses of the first optical system G1) to be also used in projection among the lenses (the lenses of the first optical system G1 and the third optical system G3) to be used in imaging, and the number of reflective surfaces of projection light further decreases compared to a case where the separation member S is not arranged on the most magnification side among the reflection members in the imaging optical system like the projection display device 3 according to the third embodiment shown in FIG. 3. For this reason, it is possible to further suppress reflected ghost.

In the projection display device 7 of the embodiment, it is preferable that the first optical system G1, the separation member S, and the third optical system G3 are arranged linearly such that the separation member S reflects light on the optical path from the second optical system G2 toward the first optical system G1 and transmits light on the optical path from the first optical system G1 toward the third optical system G3. During projection, since a light source with high brightness is not needed, the configuration of the image projection unit 11 to be used in projection is likely to increase in size compared to the configuration of the imaging element 10 to be used in imaging. For this reason, the first optical system G1, the separation member S, and the third optical system G3 to be used in imaging are arranged linearly, whereby the total length of the device is easily suppressed. Therefore, it is advantageous to reduce the size of the entire device.

For example, the separation member S that is composed of a transflective member, such as a half mirror, generally has a transflective reflective film formed on one surface of a transparent substrate.

In the projection display device 7 of the embodiment, it is preferable that, in a case where the member having the transflective reflective film formed on one surface of the transparent substrate is used as the separation member S, the reflective film faces the first optical system G1, and the first optical system G1, the separation member S, and the third optical system G3 are arranged linearly such that the separation member S reflects light on the optical path from the second optical system G2 toward the first optical system G1 and transmits light on the optical path from the first optical system G1 toward the third optical system G3. Here, the transparent substrate means a substrate that transmits 90% or more of light.

Since the thickness of the transparent substrate of the separation member S cannot be completely eliminated, light that is transmitted through the separation member S is slightly reflected by two surfaces of an incidence surface and an emission surface of the transparent substrate, and stray light may occur.

However, the separation member S is arranged such that the reflective film faces the first optical system G1, whereby projection light emitted from the image projection unit 11 is reflected by the reflective film and is incident on the first optical system G1 without being affected by the transparent substrate of the separation member S. For this reason, projection performance is not degraded due to the separation member S, and it is possible to maintain high projection performance as the projection display device.

It is preferable that an optical system consisting of the first optical system G1 and the second optical system G2 to be used in projection is a relay optical system that forms an intermediate image MI. With such a configuration, it is possible to achieve a wide angle with one eye. Furthermore, an optical system to be used in projection is composed of a relay optical system, a reflection member that bends the optical path is easily inserted into the optical system, and a light beam on the projection display device side in projection light emitted from the projection display device can approach a horizontal state to a housing of the projection display device. For this reason, it is possible to improve the installability of the projection display device.

Even an optical system consisting of the first optical system G1 and the third optical system G3 to be used in imaging may be composed of a relay optical system that forms the intermediate image MI. With such a configuration, it is possible to achieve a wide angle with one eye.

It is preferable that, in a case where at least one of the optical system to be used in projection or the optical system to be used in imaging is the relay optical system that forms the intermediate image MI, the separation member S is arranged to be closer to the magnification side than the intermediate image MI on the optical path. With such a configuration, the number of lenses (the lenses of the first optical system G1) to be used in projection among the lenses (the lenses of the first optical system G1 and the third optical system G3) to be used in imaging is reduced, and the number of reflective surfaces of projection light decreases. For this reason, it is possible to suppress reflected ghost.

Figure 8:
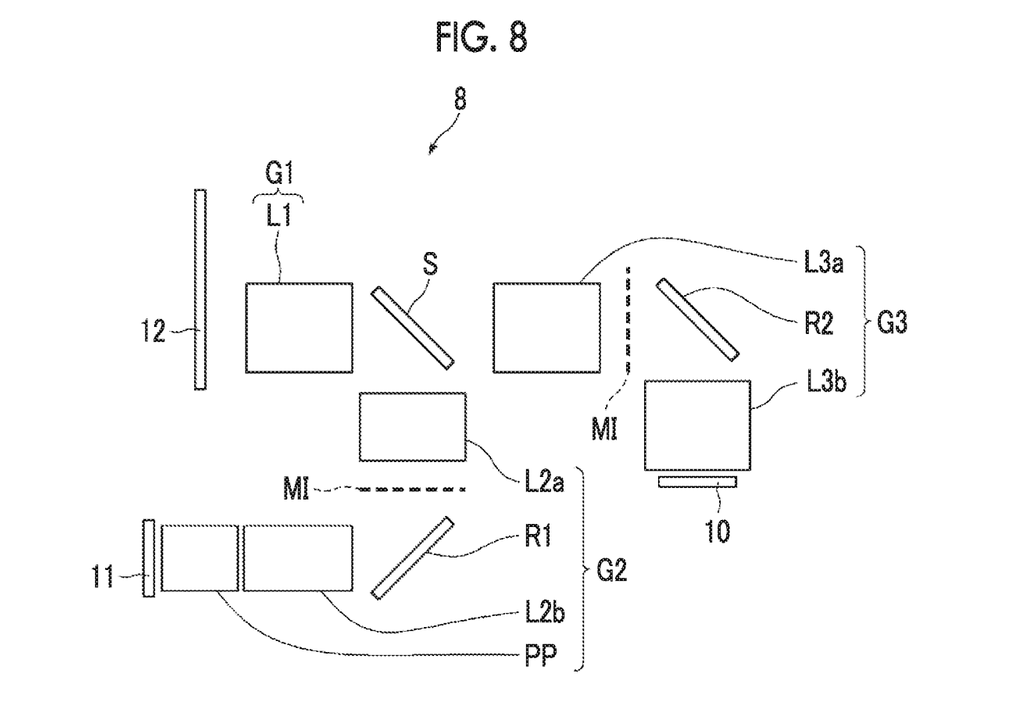
FIG. 8 is a schematic configuration diagram of a projection display device according to an eighth embodiment of the invention.

Next, an eighth embodiment of a projection display device of the invention will be described in detail referring to the drawings. FIG. 8 is a schematic configuration diagram of a projection display device according to the eighth embodiment of the invention. In FIG. 8, the screen 12 side becomes the magnification side in the optical path order. In the embodiment, elements similar to the elements in FIG. 7 are represented by the same reference numerals and description thereof will not be repeated unless needed. Here, only a difference will be primarily described.

As shown in FIG. 8, a projection display device 8 of the embodiment is different from the projection display device 7 of the seventh embodiment in that a reflection member R2 is arranged near a position where the intermediate image MI is formed in the third optical system G3 (between the lens group L3a and the lens group L3b).

An optical system consisting of the first optical system G1 and the third optical system G3 to be used in imaging is composed of a relay optical system, whereby the reflection member R2 that bends the optical path is easily inserted into the third optical system G3. The reflection member R2 is inserted into the third optical system G3, whereby it is possible to suppress the total length of the third optical system G3 even in a case where the third optical system G3 is designed with high performance to comprise multiple lenses. For this reason, it is possible to achieve both of performance and reduction in size of the projection display device.

Even in the projection display device 8 of the embodiment, it is possible to obtain the same effects as the projection display device 7 of the seventh embodiment.

Figure 9:
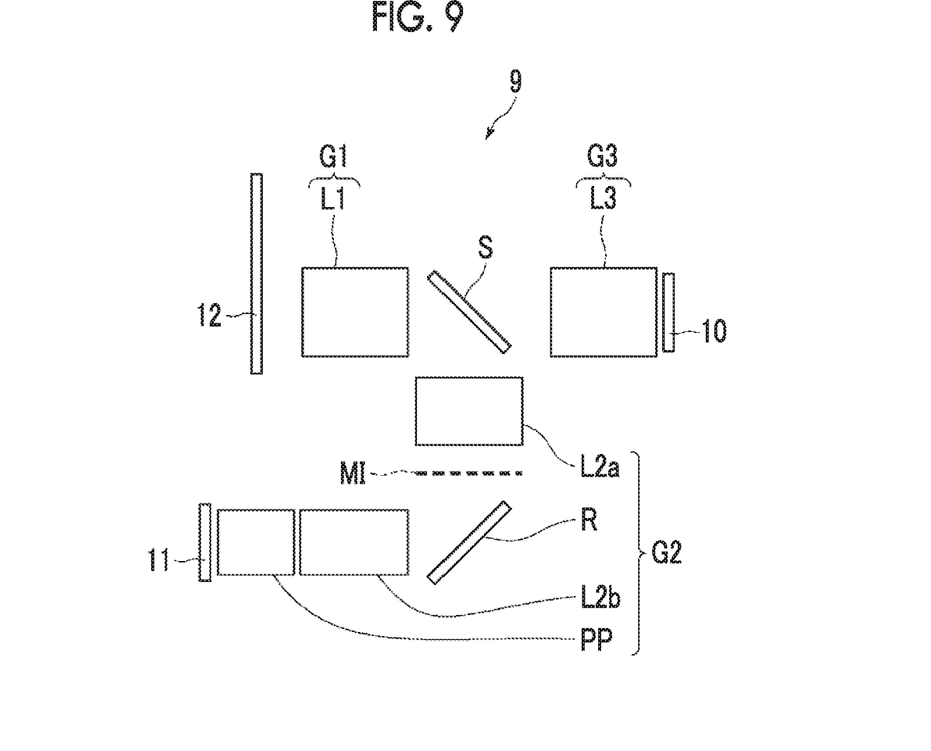
FIG. 9 is a schematic configuration diagram of a projection display device according to a ninth embodiment of the invention.

Next, a ninth embodiment of a projection display device of the invention will be described in detail referring to the drawings. FIG. 9 is a schematic configuration diagram of a projection display device according to the ninth embodiment of the invention. In FIG. 9, the screen 12 side becomes the magnification side in the optical path order. In the embodiment, elements similar to the elements in FIG. 7 are represented by the same reference numerals and description thereof will not be repeated unless needed. Here, only a difference will be primarily described.

As shown in FIG. 9, a projection display device 9 of the embodiment is different from the projection display device 7 of the seventh embodiment in that a third optical system G3 consists of only a lens group L3. In this way, the third optical system G3 may have a simple configuration, and with such a configuration, reduction in size of the projection display device is achieved.

Even in the projection display device 9 of the embodiment, it is possible to obtain the same effects as the projection display device 7 of the seventh embodiment.

Although embodiments of the projection display device of the invention have been described above, the invention is not limited to the embodiments.

For example, in the imaging optical system, in a case where an optical system consisting of the first optical system and the second optical system to be used in projection is a relay optical system, the separation member may be arranged at the position of the intermediate image on the optical path or the position adjacent to the intermediate image on the optical path. Since a space is easily secured near the intermediate image, with such a configuration, the separation member is easily arranged.

As described above, in a case where the separation member is arranged near the intermediate image, an optical system to be closer to the magnification side than the intermediate image becomes the first optical system. In a case where a relay optical system is made to have high performance, since many lenses are needed to be closer to the magnification side than the intermediate image, the number of lenses of the first optical system G1 to be used in common in projection and imaging increases. As a result, since it is possible to suppress the number of lenses of the second optical system to be used only in projection and the third optical system to be used only in imaging, it is possible to achieve reduction in size of the entire imaging optical system.

The light valve is not limited to an aspect in which light from the light source is spatially modulated by the image display element and is output as the optical image based on image data, and an aspect in which light itself output from a self-luminous image display element is output as an optical image based on image data. As the self-luminous image display element, for example, an image display element, in which light emitting elements, such as light emitting diodes (LED) or organic light emitting diodes (OLED), are arranged in a two-dimensional manner is exemplified.

In addition to those described above, various improvements or modifications may be of course made without departing from the spirit and scope of the invention.

EXPLANATION OF REFERENCES 1 to 9: projection display device
10: imaging element
11: image projection unit
12: screen
G1: first optical system
G2: second optical system
G3: third optical system
L1 to L3b: lens group
MI: intermediate image
P, P1, P2: polarizer
PP: optical member
R, R1, R2: reflection member
S, SP: separation member
W: quarter wave plate

What is claimed is:

1. A projection display device comprising:
    an imaging element that performs imaging with received light;
    a light valve that emits an optical image based on image data in a prescribed polarization state; and
    an imaging optical system that projects an optical image of light emitted from the light valve onto a magnification side imaging surface and forms an image of light incident from a magnification side on the imaging element,
    wherein the imaging optical system comprises a first optical system that comprises at least one lens and is used in common in projection and imaging, a second optical system that comprises at least one lens and is used only in projection, a third optical system that comprises at least one lens and is used only in imaging, and a separation member that separates an optical path from the second optical system toward the first optical system from an optical path from the first optical system toward the third optical system,
    the first optical system comprises, in order from the magnification side, a quarter wave plate and a polarizer arranged in a state of transmitting the light emitted from the light valve or the third optical system comprises a polarizer arranged in a state of shielding the light emitted from the light valve, and
    in a case where the first optical system comprises the quarter wave plate and the polarizer, the quarter wave plate and the polarizer are arranged on a most reduction side in the first optical system on an optical path.

2. The projection display device according to claim 1, wherein an extinction ratio of the polarizer is less than 0.1%.

3. The projection display device according to claim 1, wherein the separation member is a reflective polarizer.

4. The projection display device according to claim 1, further comprising:
    an adjustment mechanism that adjusts a transmission axis direction of the polarizer comprised in the first optical system or the polarizer comprised in the third optical system.

5. The projection display device according to claim 1, wherein, in a case where the third optical system comprises the polarizer, the polarizer is arranged on a most magnification side in the third optical system on an optical path.

6. The projection display device according to claim 1, wherein the second optical system comprises a polarizer arranged in a state of transmitting the light emitted from the light valve.

7. The projection display device according to claim 6, further comprising:
    an adjustment mechanism that adjusts a transmission axis direction of the polarizer comprised in the second optical system.

8. The projection display device according to claim 6, wherein the polarizer comprised in the second optical system is arranged on a most magnification side in the second optical system on an optical path.

9. The projection display device according to claim 1, further comprising:
    two or more polarizers between a lens of the first optical system on a most reduction side on an optical path and the imaging element.

10. The projection display device according to claim 1, wherein an optical system consisting of the first optical system and the second optical system to be used in projection is a relay optical system that forms an intermediate image.

11. The projection display device according to claim 1, wherein an optical system consisting of the first optical system and the third optical system to be used in imaging is a relay optical system that forms an intermediate image.

12. The projection display device according to claim 10, wherein the separation member is arranged to be closer to the magnification side than the intermediate image on an optical path.

13. A projection display device comprising:
    an imaging element that performs imaging with received light;
    a light valve that emits an optical image based on image data; and
    an imaging optical system that projects an optical image of light emitted from the light valve onto a magnification side imaging surface and forms an image of light incident from a magnification side on the imaging element, wherein the imaging optical system comprises a first optical system that comprises at least one lens and is used in common in projection and imaging, a second optical system that comprises at least one lens and is used only in projection, a third optical system that comprises at least one lens and is used only in imaging, and a separation member that is transflective and separates an optical path from the second optical system toward the first optical system from an optical path from the first optical system toward the third optical system, the separation member is arranged on a most magnification side among reflection members in the imaging optical system, and an optical system consisting of the first optical system and the third optical system to be used in imaging is a relay optical system that forms an intermediate image.

14. The projection display device according to claim 13, wherein the separation member is arranged in a state of reflecting light on the optical path from the second optical system toward the first optical system and transmitting light on the optical path from the first optical system toward the third optical system.

15. The projection display device according to claim 14, wherein the separation member has a transflective reflective film that is formed on one surface of a transparent substrate and faces the first optical system, and is arranged in a state of reflecting light on the optical path from the second optical system toward the first optical system and transmitting light on the optical path from the first optical system toward the third optical system.

16. The projection display device according to claim 13, wherein an optical system consisting of the first optical system and the second optical system to be used in projection is a relay optical system that forms an intermediate image.

17. The projection display device according to claim 16, wherein the separation member is arranged to be closer to the magnification side than the intermediate image on an optical path.

18. A projection display device comprising:

an imaging element that performs imaging with received light;

a light valve that emits an optical image based on image data in a prescribed polarization state;

an imaging optical system that projects an optical image of light emitted from the light valve onto a magnification side imaging surface and forms an image of light incident from a magnification side on the imaging element; and an adjustment mechanism that adjusts a transmission axis direction of the polarizer comprised in the first optical system or the polarizer comprised in the third optical system, wherein the imaging optical system comprises a first optical system that comprises at least one lens and is used in common in projection and imaging, a second optical system that comprises at least one lens and is used only in projection, a third optical system that comprises at least one lens and is used only in imaging, and a separation member that separates an optical path from the second optical system toward the first optical system from an optical path from the first optical system toward the third optical system, and the first optical system comprises, in order from the magnification side, a quarter wave plate and a polarizer arranged in a state of transmitting the light emitted from the light valve or the third optical system comprises a polarizer arranged in a state of shielding the light emitted from the light valve.

\* \* \* \* \*